(12) United States Patent
Blackwell et al.

(10) Patent No.: US 9,037,705 B2
(45) Date of Patent: May 19, 2015

(54) ROUTING OF PERFORMANCE DATA TO DEPENDENT CALCULATORS

(71) Applicant: CA, Inc., Islandia, NY (US)

(72) Inventors: Aaron Kenneth Blackwell, Redding, CT (US); Marco Gagliardi, Brisbane, CA (US); Benny Tseng, Brookfield, CT (US); David Tootill, Mercer Island, WA (US); Mark S. LoSacco, New Milford, CT (US); Ramana V. Lokavarapu, Pleasanton, CA (US); Gabriel D. Underwood, Corte Madera, CA (US)

(73) Assignee: CA, Inc., New York, NY (US)

( * ) Notice: Subject to any disclaimer, the term of this patent is extended or adjusted under 35 U.S.C. 154(b) by 241 days.

(21) Appl. No.: 13/687,770

(22) Filed: Nov. 28, 2012

(65) Prior Publication Data

US 2014/0149575 A1    May 29, 2014

(51) Int. Cl.
| | | |
|---|---|---|
| *G06F 15/173* | (2006.01) | |
| *H04L 12/26* | (2006.01) | |
| *G06F 15/16* | (2006.01) | |
| *G06F 9/46* | (2006.01) | |

(52) U.S. Cl.
CPC ............ *H04L 43/04* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 6,405,251 B1* | 6/2002 | Bullard et al. | 709/224 |
| 6,633,835 B1 | 10/2003 | Moran et al. | |
| 6,801,940 B1 | 10/2004 | Moran et al. | |
| 7,003,772 B2 | 2/2006 | Dillenberger et al. | |
| 7,650,403 B2* | 1/2010 | Koetke et al. | 709/224 |
| 8,214,495 B2 | 7/2012 | Alon et al. | |
| 8,495,663 B2* | 7/2013 | Tien et al. | 719/329 |
| 8,799,460 B2* | 8/2014 | Cockrell | 709/224 |
| 2010/0318565 A1 | 12/2010 | Heil et al. | |
| 2012/0180067 A1* | 7/2012 | Funaoka et al. | 718/106 |

\* cited by examiner

*Primary Examiner* — Wen-Tai Lin
(74) *Attorney, Agent, or Firm* — Vierra Magen Marcus LLP

(57) ABSTRACT

A method, system and computer program product are disclosed for routing performance data to compute nodes. According to one aspect of the present disclosure each of a plurality of compute nodes are assigned a topic. Each topic may be associated with a set of calculations. Labeled performance metrics for an application are received. Each performance metric is labeled with a context under which the performance metric was collected. A topic is associated with each of the performance metrics based on the labeled context. Each respective node listens for a topic assigned to it in order to access the performance metrics associated with the assigned topic. Each respective node analyzes the performance metrics associated with the topic assigned to it.

22 Claims, 15 Drawing Sheets

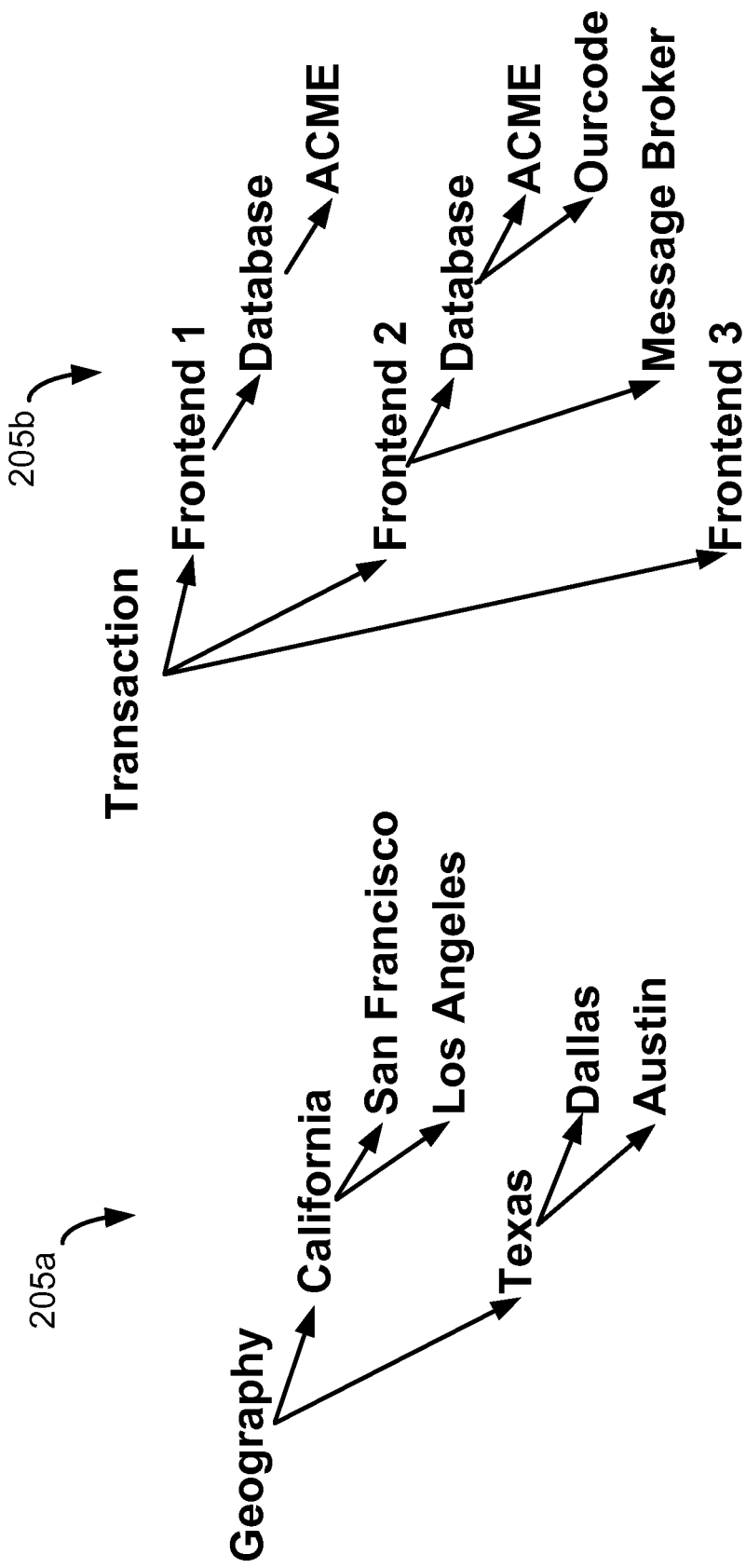

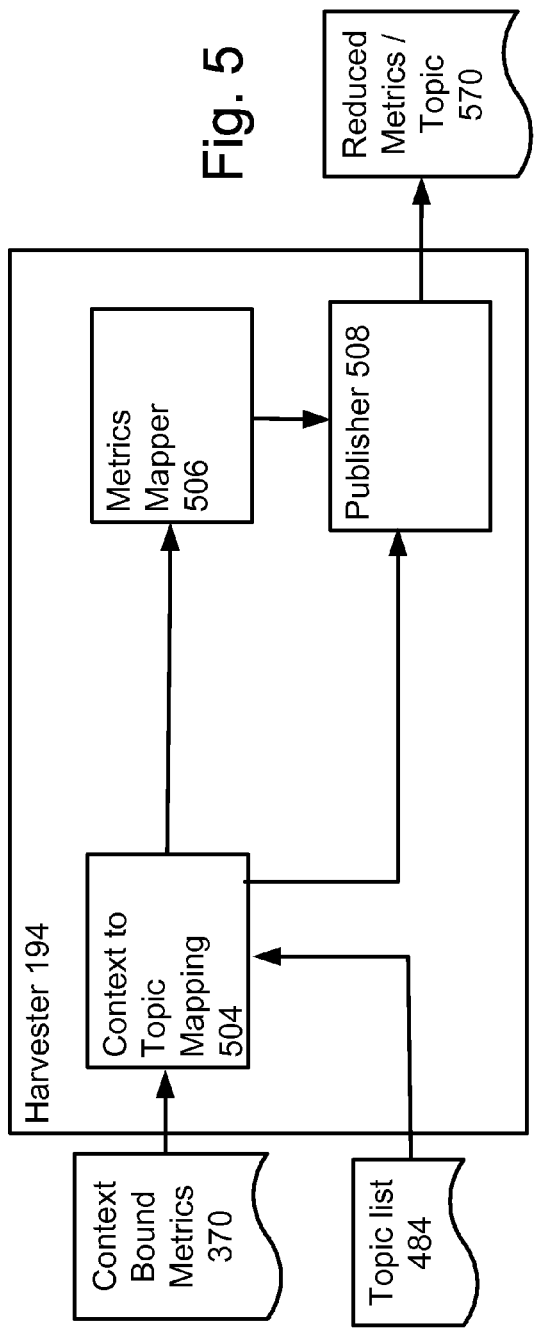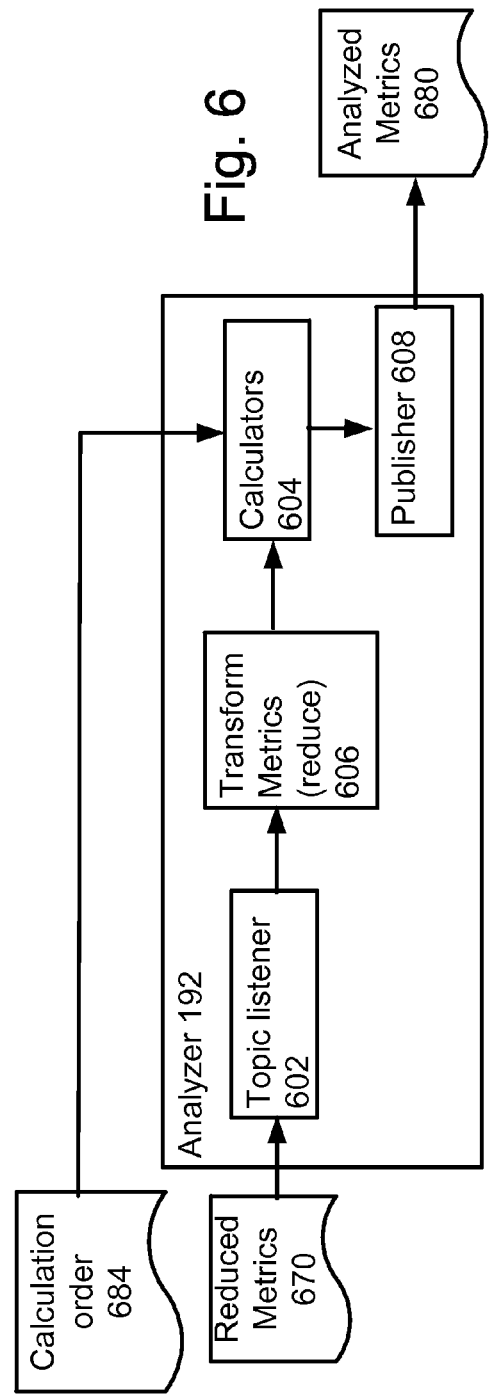

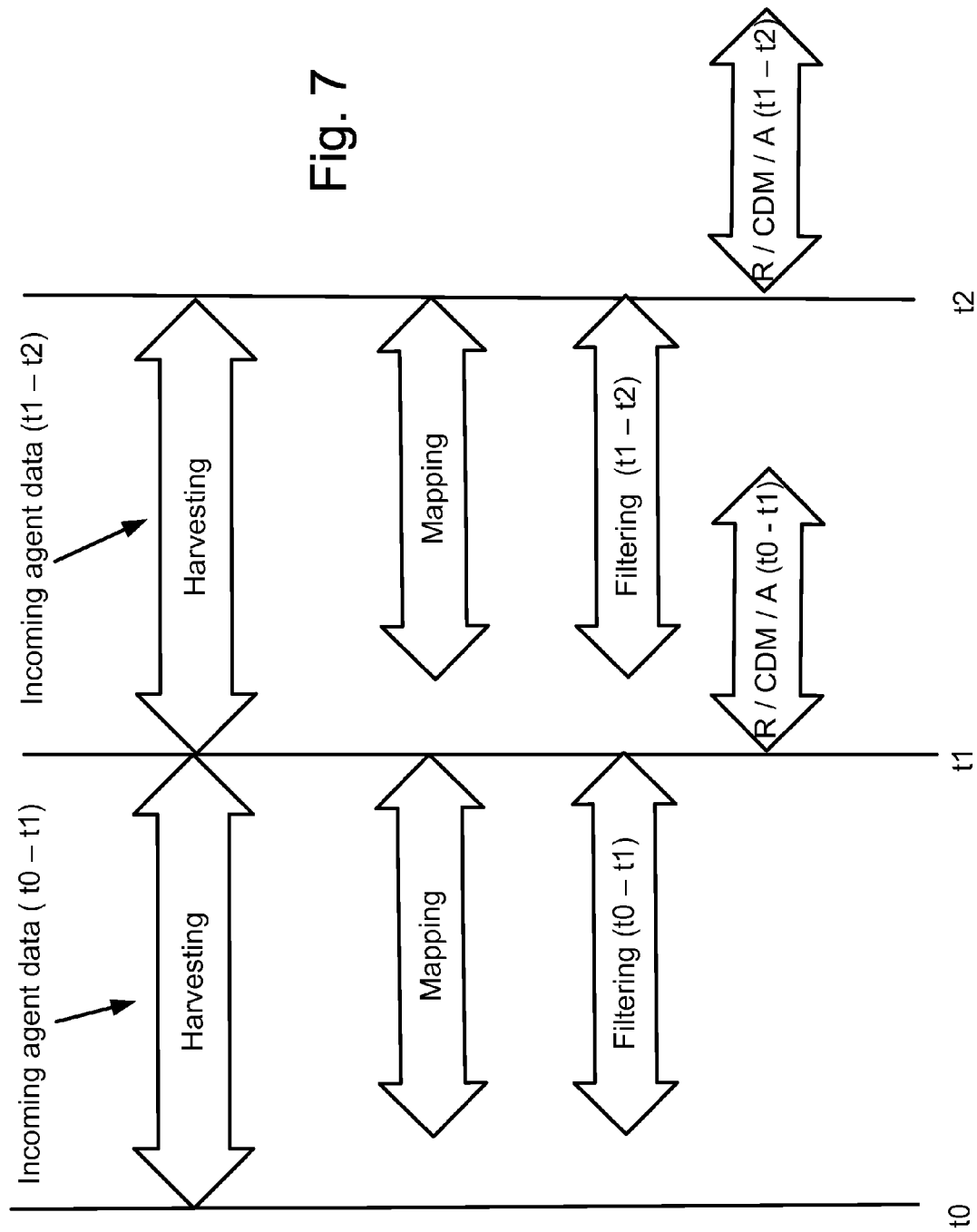

ROUTING OF PERFORMANCE DATA TO DEPENDENT CALCULATORS

BACKGROUND

The present disclosure relates to Application Performance Management (APM) software. APM allows users to diagnose performance and other issues with real-time applications. It accomplishes this using agents that gather raw metric data from applications. This raw data is consumed by calculators configured either by the software itself or by client administrators. Calculators evaluate and modify metric data to produce output results, which can be either delivered to a user interface (UI) or consumed by other calculators. The end result is a client UI displaying application status allowing application problem diagnosis and triage.

In larger deployments, it may be necessary to provision many servers, known as collectors, to receive raw metric data from agents. Therefore, each calculator could consume data from any or all collectors, and produce data that could be needed by any other calculator. With some techniques, the calculators are located so that all collectors have a well-known destination for their raw metric data, and so intermediate results are guaranteed to be produced local to their consuming calculators. However, such techniques place an absolute limit on the scalability of the APM software. This limit may correspond to capacity of the host machine running the calculations.

BRIEF SUMMARY

According to one aspect of the present disclosure each of a plurality of compute nodes are assigned a topic. Labeled performance metrics for an application are received. Each performance metric is labeled with a context under which the performance metric was collected. A topic is associated with each of the performance metrics based on the labeled context. Each respective node listens for a topic assigned to it in order to access the performance metrics associated with the assigned topic. Each respective node analyzes the performance metrics associated with the topic assigned to it.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 2B is one embodiment of a context tree for a geographical context.

FIG. 2C depicts one embodiment of a context tree for a transaction context.

FIG. 5 shows further details of one embodiment of the Harvester.

FIG. 6 shows further details of one embodiment of the Analyzer.

FIG. 7 shows a timing diagram for one embodiment.

DETAILED DESCRIPTION

Figure 1A:
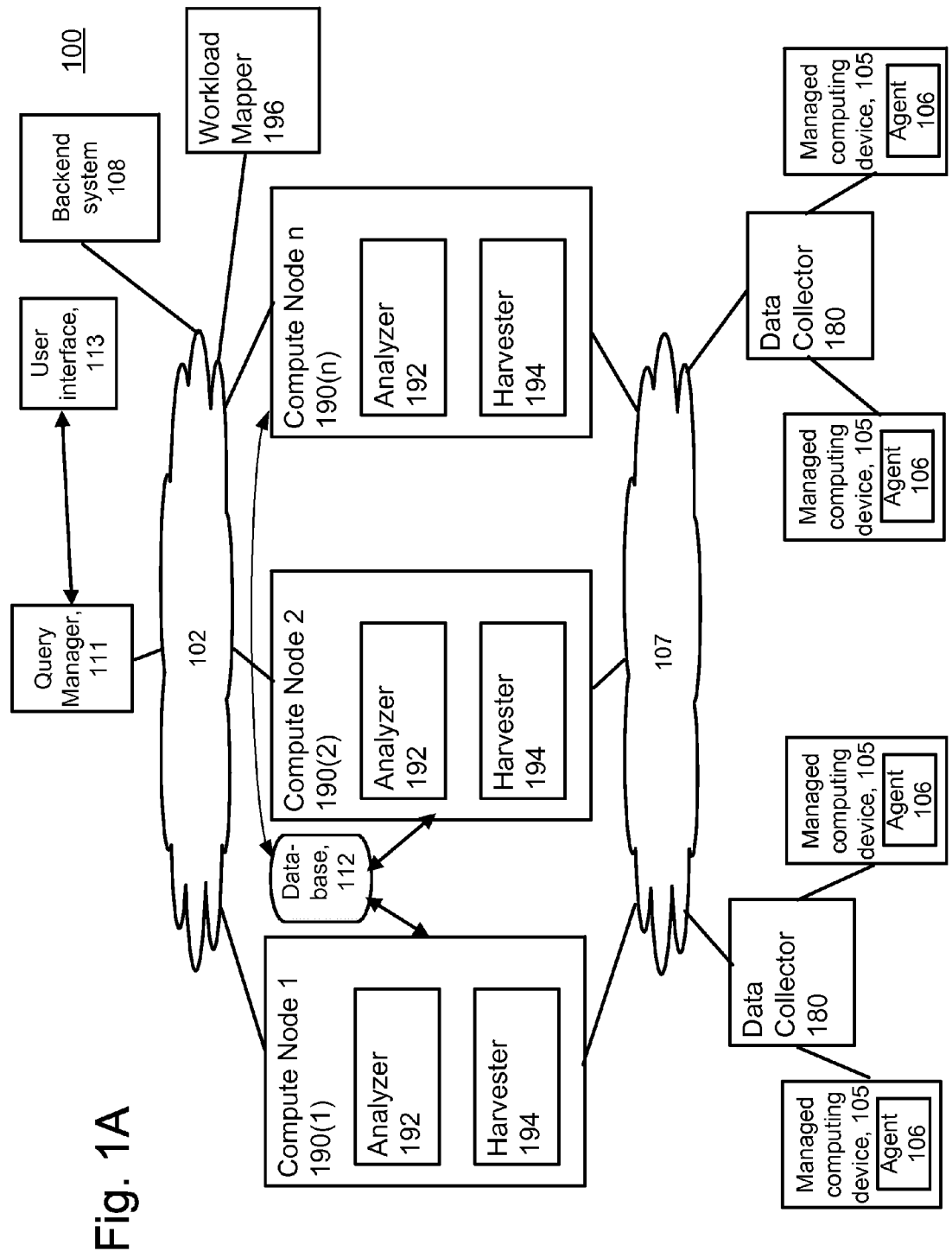
FIG. 1A illustrates an example system in which embodiments may be practiced is illustrated.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

According to one embodiment of the present disclosure each of a plurality of compute nodes are populated with Harvesters that consume performance metrics from queues. The Harvesters assign the metrics topics. Analyzers consume the metrics according to their topics. Labeled performance metrics for an application may be received by the Harvesters. Each performance metric may be labeled with one or more contexts under which the performance metric was collected. One or more topics may be associated with each performance metric based on its labeled contexts. Each compute node listens for the topics assigned to the Analyzer running on the node in order to access the performance metrics associated with the assigned topics. The Analyzer residing on each respective node analyzes the performance metrics associated with the topics assigned to them. A Workload Mapper assigns Analyzers to nodes so that Analyzers with similar topics reside on the same node, limiting the number of nodes that must listen to each topic.

Referring now to FIG. 1A, an example system 100 in which embodiments may be practiced is illustrated. FIG. 1A depicts an example system 100 in which multiple instances of an application run on different managed computing devices 105, and Agents 106 on the servers report metric data. The managed computing devices 105 may be any type of computing device having a processor for executing code to achieve a desired functionality. In one embodiment, the managed computing devices are application servers. The managed computing devices 105 can be located remotely from one another or co-located.

The metric data may pertain to the performance of an application being monitored on the managed computing devices 105. For example, a corporation running an enterprise application such as a web-based e-commerce application may employ a number of application servers at one location for load balancing. Agent software 106 running on the managed computing devices 105 gather information from an application, middleware or other software running on the respective managed computing devices. Such information may be obtained using instrumentation, one example of which is byte code instrumentation. However, the gathered data may be obtained in other ways as well. The Agents essentially live in the computing device being monitored and provide a data acquisition point.

In one embodiment, the Agents 106 label the metric data with one or more hierarchical context strings. The metric data so tagged may be referred to as "context bound metrics". The Agents 106 forward the context bound metrics to data collectors 180. There may be any number of data collectors 180 in the system 100. Note that there could be an extremely large volume of metric data collected by the Agents 106. Also, there could be many more managed computing devices 105 than depicted.

The system has a number of compute nodes 190(1)-190(n), each of which includes a Harvester 194 and an Analyzer 192. Each compute node 190 could be a separate computing system, such as a server. Each Harvester 194 running on compute nodes 190 receives the context bound metrics from the data collectors 180 over network 107. Any Harvester 194 can receive any context bound metric, and the number of compute nodes can be adjusted as required for scalability. Harvester 194 and Analyzer 192 may persist context bound metrics to Database nodes 112 for long term storage.

As noted, there can be a very large volume of metric data. There may also be many different calculations, computations, etc. to be made on the metric data. In one embodiment, Workload Mapper 196 assigns each compute node 190 certain ones of the calculations. This assignment may be based on dependencies between the various calculations. Each calculation depends on specific metric data that could potentially be collected by any of the Agents 106. The necessary metric data for a given calculation is routed to the compute node 190 assigned to perform that calculation, in one embodiment. Therefore, the calculation may be performed efficiently by the compute node 190.

The following example will be used to illustrate. If all of the data collected by one of the Agents 106 were sent to one compute node 190 to be processed and analyzed this could be inefficient. That compute node 190 may actually need metric data that was sent to other compute nodes to complete its calculations. By assigning calculations to nodes and by providing the data needed for those calculations, as in one embodiment, this problem is avoided.

Also, the system 100 is very scalable. A new compute node 190 can easily be added to the system if, for example, there are new calculations to perform or additional metrics to harvest. The new node could also perform a calculation previously performed by another compute node 190 whose load has increased such that off-loading some of its workload may be desirable. The new compute node 190 can be added anywhere. The new compute node does not need to be located where the metric data for its calculations is collected.

After the compute nodes 190 analyze the metric data, they may report it to one or more Query Managers running on compute nodes 111, which may be the same or distinct from compute nodes 190. The computer running Query Manager 111 can be local to, or remote from, the managed computing devices 105. Likewise, the compute nodes running Query Manager 111 can be local to, or remote from, the compute nodes 190. The managed computing device 105 can also call a backend system 108 such as a mainframe, database or some other un-instrumented computing device. While a full range of performance metrics can be obtained from a managed computing device due to the use of instrumentation, limited information may be obtained regarding an un-instrumented subsystem from the methods that are used to call out to them from the managed computing device. The managed computing devices may be considered to be front end subsystems. The networks 102 and 107 can be the same, overlapping or distinct, and can include, e.g., the Internet, another wide area network, and/or a local area network.

Query Manager 111 can be provided on a separate computing device such as a workstation that communicates with a user interface 113, such as a monitor, to display information based on data received from the compute nodes 190. The Query Manager can also request retrieval of metrics stored in database. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The Query Manager 111 and user interface display 113 might be provided at a corporate headquarters location. Other applications which are not necessarily web-based or involve retail or other sales similarly employ agents for monitoring their systems. For example, a bank may use an application for processing checks and credit accounts. Moreover, in addition to the multi-computing device arrangements mentioned, a single computing device can be monitored as well with one or more agents.

Various approaches are known for instrumenting software to monitor its execution. For example, tracing may be used to track the execution of software. One example of tracing is discussed in U.S. Pat. No. 7,870,431, issued Jan. 11, 2011, titled "Transaction Tracer," and incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it may be referred to as a managed application, and a computing device on which the application runs may be referred to as a managed computing device. The agent software receives information from the probes and may communicate the information to another process, such as at the data collector 180, or process the information locally, such as to determine whether the information indicates an abnormal condition. The agent thus collects and summarizes information received from the probes. The probes collect information as may be defined by a directives file. For example, the information from the probes may indicate start and stop times of a transaction or other execution flow, or of individual components within a transaction/execution flow. This information can be compared to pre-established criteria to determine if it is within bounds. If the information is not within bounds, the agent can report this fact so that appropriate troubleshooting can be performed. The agents are typically aware of the software executing on the local managed computing device with which they are associated.

The probes can report a standard set of metrics which may include: CORBA method timers, Remote Method Invocation (RMI) method timers, thread counters, network bandwidth, JDBC update and query timers, servlet timers, Java Server Pages (JSP) timers, system logs, file system input and output bandwidth meters, available and used memory and EJB (Enterprise JavaBean) timers. A metric is a measurement of a specific application activity.

Figure 1B:
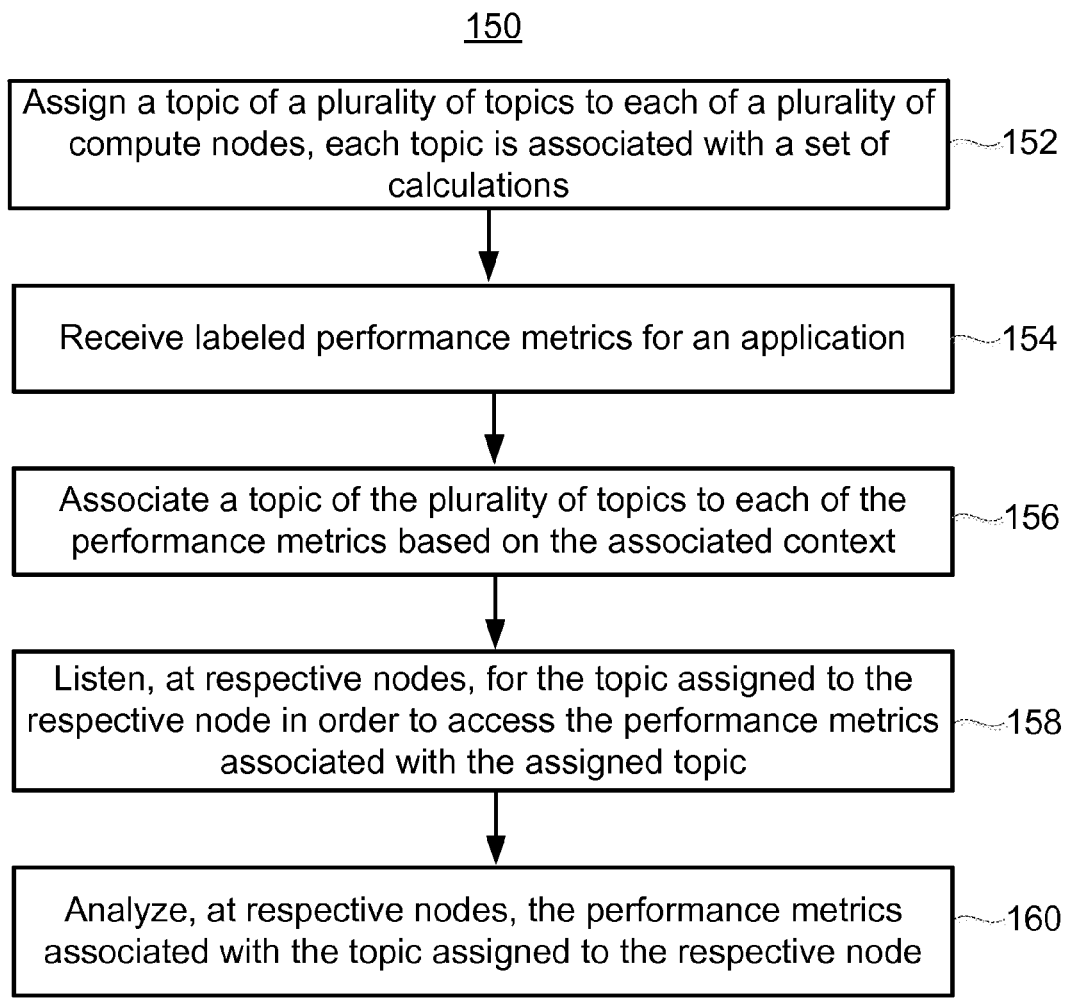
FIG. 1B is a flowchart of one embodiment of a process of routing performance metrics for efficient analysis.

FIG. 1B is a flowchart of one embodiment of a process 150 of routing performance metrics for efficient analysis. The process may be used in a system such as FIG. 1A. The process 150 may be used to efficiently provide compute nodes 190 with the performance metrics that compute nodes 190 are dependent upon to perform their calculations. In step 152, a topic is assigned to each Analyzer 192 running on compute node 190 in the system. Each compute node 190 may be assigned any number of topics. Each of the topics may be associated with a set of one or more calculations to be performed on the metric data collected by the Agents 106. Thus, step 152 may also assign calculations associated with the topics to compute nodes 190. In one embodiment, Workload Mapper process 196 determines the topics and assigns the topics and calculations to the compute nodes 190.

The calculation assignment may be chosen to facilitate efficient processing of the performance metrics, in one embodiment. Note that some calculations may depend on results of other calculations. In one embodiment, calculations are grouped such that a calculation that depends on another is performed at the same compute node 190 as the one it depends upon. This allows for very efficient processing of the metric data. Further details of this are discussed with respect to FIG. 3B.

In step 154, labeled performance metrics for an application being monitored are received at the various compute nodes 190. In one embodiment, the performance metrics are collected by Agents 106 under different contexts. In one embodiment, the Agents 106 forward the context bound metrics to data collectors 180. The context bound metrics are transferred from the data collectors 180 to one of the compute nodes 190. In one embodiment, a load balancer is used to determine which compute node 190 receives which context bound metrics. In one embodiment, the Harvester 194 receives and processes the context bound metrics.

In step 156, topics are associated with the performance metrics based on the contexts bound to the performance metrics. Recall that in step 152 topics were assigned to the various compute nodes 190. In one embodiment, Harvester 194 determines an appropriate topic such that the performance metrics will be routed to various compute nodes 190 for efficient analysis. In one embodiment, Harvester 194 receives information from Workload Mapper 196 that it uses to map context bound metrics to topics. Further details are described below.

In one embodiment, each Harvester 194 may route metrics collected on its compute node 190 to co-located metric mapper module (FIG. 5, 506). Metric mapper 506 maps multiple performance metrics collected on the node into a single consolidated performance metric that it writes to the outbound message bus for routing to the compute node 190 containing Analyzer 192 that reduces the performance metrics to their final value. Analyzer 192 may receive consolidated performance metrics from several Harvesters 194. This significantly reduces the number of performance metrics that must be routed on the message bus to the compute node 190 containing Analyzer 192.

In step 158, each of the respective compute nodes 190 listens for the topics that were assigned to it in order to access the performance metrics needed for its calculations.

In step 160, each respective compute node 190 analyzes the performance metrics that it obtained in step 158. Step 160 may include the compute nodes 190 performing the calculations assigned to them. Each compute node 190 may perform numerous calculations. As noted, the calculations may be assigned in a manner such that a calculation that depends on another are performed at the same compute node 190 as the one(s) it depends upon. This may allow for more efficient processing, as the compute node 190 may be provided the metric data for all the calculations, in one embodiment. It may be stated that locality of reference is achieved through this efficient routing. For example, the performance data that is needed for a given calculation may be routed such that it is local (e.g., on the same compute node 190).

After performing the calculation assigned to it, compute nodes 190 may report the data to Query Manager 111.

Figure 2A:
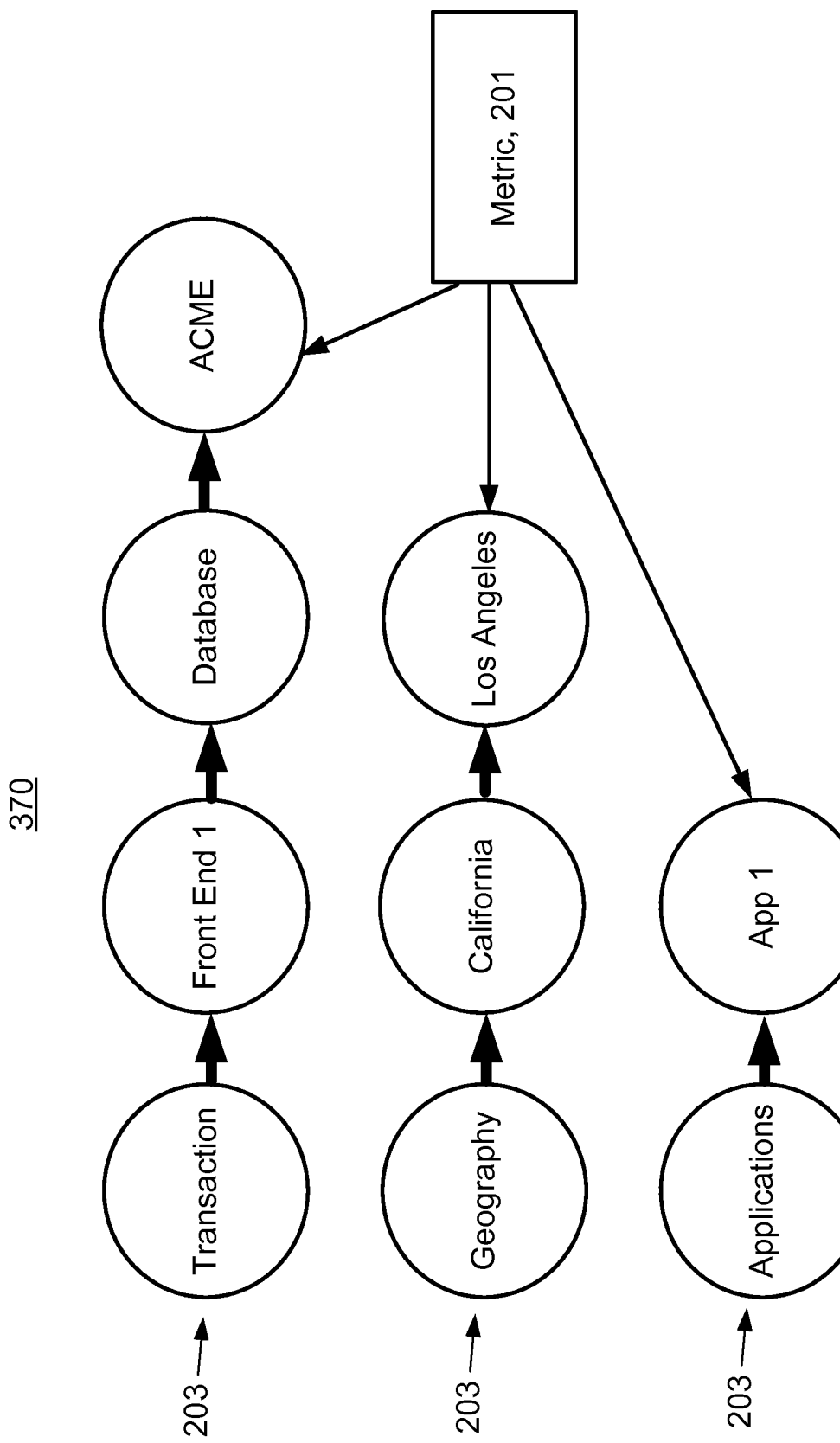
FIG. 2A shows one embodiment of a context bound metric.

In one embodiment, the Agents 106 associate contexts with the metric data. These contexts may be used to facilitate routing the metric data to the compute nodes 190 so that calculations may be performed efficiently. FIG. 2A shows one embodiment of a context bound metric 370. Specifically, an example of several contexts 203 that are associated with a metric 201 is depicted. There are three contexts 203 in this example: Transaction, Geography, and Applications. When the Agent 106 associates the context 203 with the metric 201, this may be referred to as a context bound metric 370.

In one embodiment, a context is a path to a node in a context tree. FIG. 2B depicts an example of a context tree 205a for a geography context. FIG. 2C depicts an example of a context tree 205b for a Transaction context. As one example from FIG. 2B, a geography context might be Geography|California|San Francisco. As one example from FIG. 2C, a transaction context might be Transaction|Frontend 1|Database|ACME. Thus, in one embodiment, a context is represented by a string.

Contexts may be used to easily associate metrics to specific computations. For example, consider if a desired computation is to aggregate all metrics that were collected by Agents in San Francisco. By finding all performance metrics having a geographic context of San Francisco, the set is found. These metrics may then be sent to a specific compute node 190 containing the Analyzer 192 that performs the aggregation.

Contexts may be defined in a number of ways. One way to define a context is to manually define them. The Agents 106 may be then instructed what contexts to bind to the metrics. Some or all of the contexts could also be determined automatically. For example, an Agent could determine a context based on various components that it is monitoring.

Figure 3A:
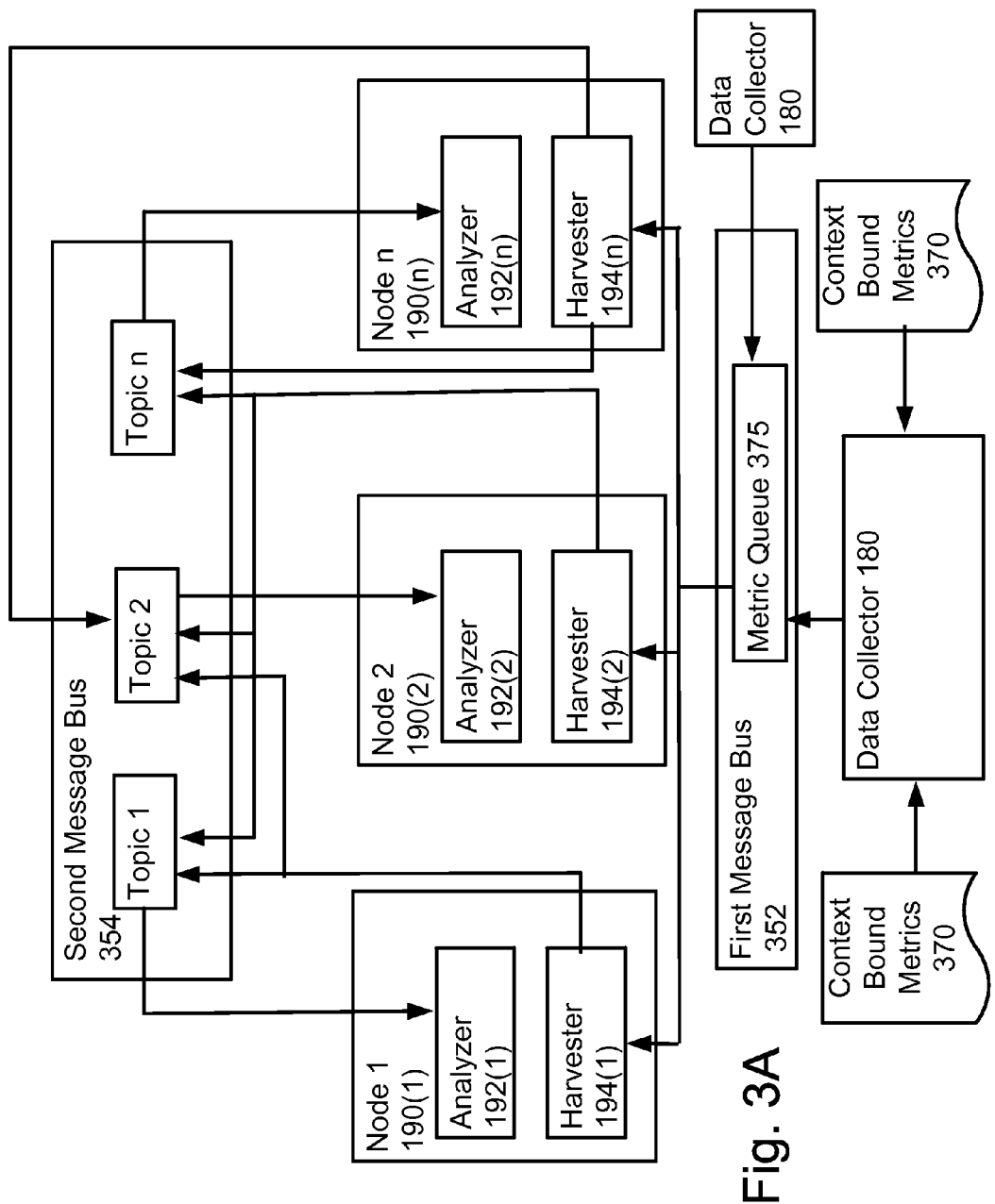
FIG. 3A depicts a flow of data in one embodiment.

FIG. 3A depicts a flow of data in one embodiment. The data flow is one embodiment of data flow for the system of FIG. 1A. In one embodiment, a publish-subscribe messaging system is used for the data flow in FIG. 3A. One example messaging system that may be used is the Java Message Service (JMS). In one embodiment, there is a first message bus 352 that manages a metric queue 375. The data collectors 180 may publish context bound metrics 370 to the metric queue 375. In one embodiment, all of the Harvesters 194(1)-194(n) subscribe to the metric queue 375. In this way, all the messages are effectively partitioned between the Harvesters. If the context bound metrics 370 are published to the first message bus 352 as messages, then each message may be sent to one of compute nodes 190. The first message bus 352 could be implemented with Active MQ, but that is not required. Queue based messaging systems are well-known and any suitable messaging system can be used.

There is another logical message bus 354 that services various topics. The Harvester processes 194 may publish the metrics to the various topics. The Analyzers 192 may subscribe to these topics. In one embodiment, all Analyzers 192 that subscribe to a particular topic will receive messages for that topic from the second message bus 354. The second message bus 354 could be implemented with Active MQ, and could be combined with the first message bus into a single implementation, but neither is required. Topic-based messaging systems are well-known and any suitable messaging system can be used. Typically in such systems messages are published to "topics" or named logical channels. Subscribers in a topic-based system receive all messages published to the topics to which they subscribe, and all subscribers to a topic receive the same messages. The data flow of FIG. 3A is not limited to any particular topic-based messaging systems. In one embodiment, by assigning performance metrics to specific topics, virtual locality of reference is achieved. For example, each topic may have a virtual affinity to the consuming Analyzer 192.

Figure 3B:
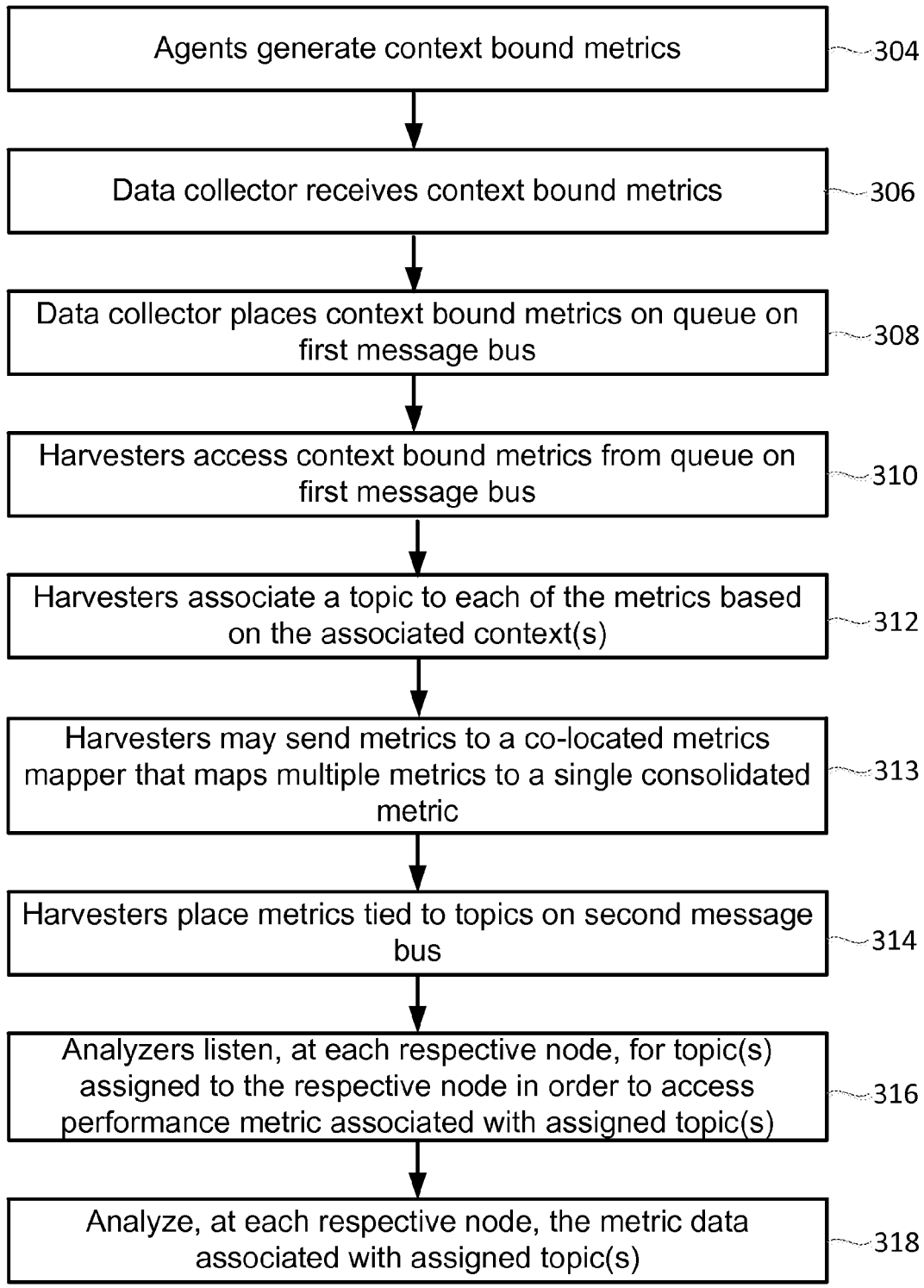
FIG. 3B is a flowchart of one embodiment of a process of processing metric data.

FIG. 3B is a flowchart of one embodiment of a process 300 of processing metric data. Reference will be made to FIG. 3A when discussing process 300. Process 300 provides further details for one embodiment of the process of FIG. 1B. In step 304, the Agents 106 generate context bound metrics 370. One example of a context bound metric 370 is depicted in FIG. 2A. In one embodiment, the Agents 106 collect the performance metrics under a variety of contexts. The contexts that are assigned to the metric may depend upon the context under which it was collected.

In step 306, the data collector 180 receives the context bound metrics 370 from the Agents. The data collector 180 could be a process running on a different machine or the same machine as the Agent. In step 308, the data collector 180 places the context bound metrics 370 on the first message bus 352. For example, the data collector publishes the context bound metrics 370 to the metric queue 375.

In step 310, various compute nodes 190 access the context bound metrics 370 from the first message bus 352. In one embodiment, a load balancer is used to determine which compute node 190 receives which the context bound metrics 370. The load balancer may be implemented by the first message bus 352. As one example, Active MQ may implement a load balancer. In one embodiment, Harvesters 194 subscribe to the metric queue 375 to receive the context bound metrics 370.

In step 312, one or more topics are associated with each of the metrics 201 based on its associated contexts 203. Each Harvester 194 may perform step 312 for the metrics it receives. In one embodiment, a HarvesterHarvester 194 determines appropriate topics for each of the metrics such that the metrics will be routed to the compute nodes 190 for efficient analysis.

In step 313, the Harvesters 194 may route metrics by their topics to metric mapper modules 506 located on the same node as Harvesters 194. The metric mapper maps several performance metrics into a single performance metric, reducing the volume of metrics placed on the second message bus 354.

In step 314, the Harvesters 194 place the metrics on the second message bus 354 based on the association with the topics. In one embodiment, Harvester 194 publishes the metrics to the various topics on the second message bus 354.

In step 316, Analyzers at each of the respective compute nodes 190 listens to the topics assigned to the compute node in order to access metrics associated with the topics. A compute node 190 may listen for any number of topics. It is possible for more than one compute node 190 to listen for the same topic. In one embodiment, listening to topics is accomplished by registering a message listener. Whenever a message is posted to the topic the listener is registered with a method may be invoked to access the message.

In step 318, each respective compute node 190 analyzes the metric data associated with the topic assigned to that node. For example, Analyzer 192 in compute node 190(1) analyzes the performance data for topic "Databases in California." Each respective compute node 190 may then provide the analyzed metrics to Analyzer 192 running on that compute node as determined by the topics associated with the Analyzers.

Figure 4B:
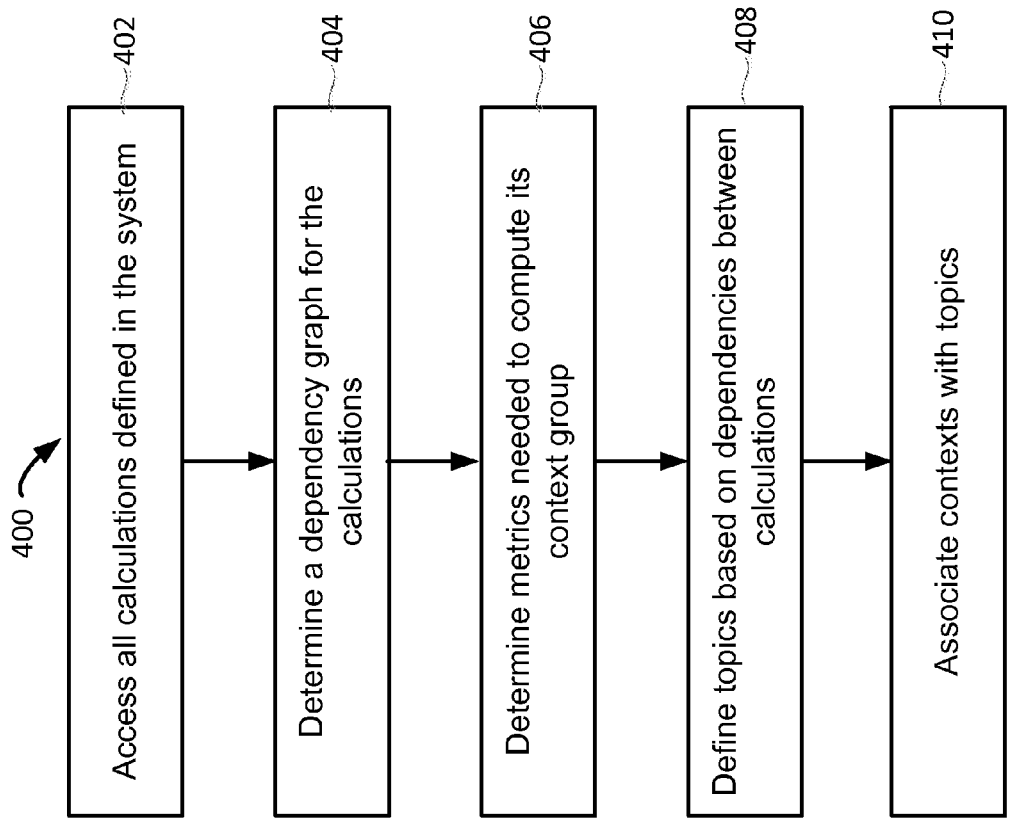
FIG. 4B is a flowchart of one embodiment of a process for determining which calculations should be performed at each compute node, as well as defining topics for each compute node.
Figure 4A:
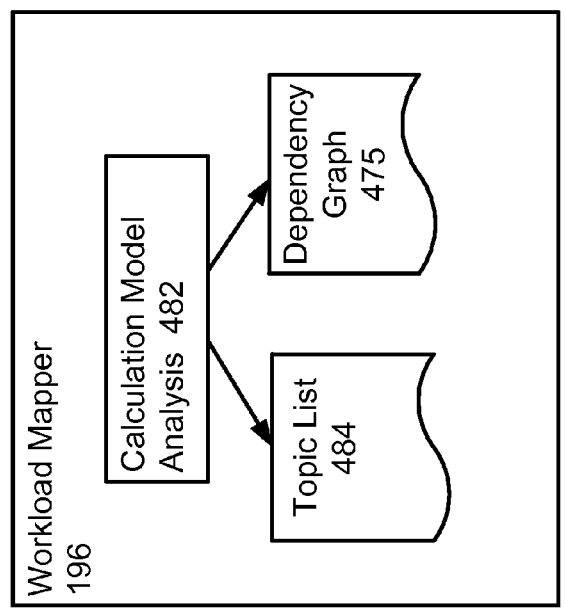
FIG. 4A shows further details of one embodiment of the Workload Mapper.

FIG. 4A shows further details of one embodiment of the Workload Mapper 196. Workload Mapper 196 may assign the calculations to the compute nodes 190. Workload Mapper 196 has a calculation model and analysis 482, which analyzes the various calculations needed to be performed somewhere in the system 100. Calculation model and analysis 482 builds a dependency graph 475 to help determine how the calculations should be assigned. The dependency graph 475 may also be used to determine an order for the calculations to be performed on a given compute node 190, if one calculation depends on another.

Calculation model and analysis 482 also generates a topic list 484. Briefly, the topic list 484 may contain a list of all of the topics to be used. Each topic may be associated with one or more contexts 203. The topic list 484 may be provided to Harvesters 194 so that they may map the context bound metrics 370 to topics.

FIG. 4B is a flowchart of one embodiment of a process 400 for determining which calculations should be performed at each compute node 190, as well as defining topics for each compute node 190. The process 400 also determines which metrics should be sent to each compute node 190. The process 400 could be performed by the Workload Mapper 196. In step 402, all calculations that are defined in the system 100 are accessed or otherwise determined. These calculations may be determined based on what analysis of the metrics is desired by the customer that owns the application being monitored.

In one embodiment, each calculation has a set of required inputs in the form of performance metrics 201. The performance metrics may be associated with one or more contexts 203. As previously discussed, the Agents 106 may generate context bound metrics 370. In one embodiment, it is these contexts that will be bound to the metrics that are factored into process 400. Each calculation may produce an output as a metric associated with one or more contexts. For example, computation A may be defined as "aggregate all frontends for application 1. This may have as input all metrics that carry a context "Agent|*|Frontend 1." Computation A may output a new metric that has a context "Aggregated|Frontend 1." Each computation and the context of its input metrics may be referred to herein as a "context group".

Figure 4C:
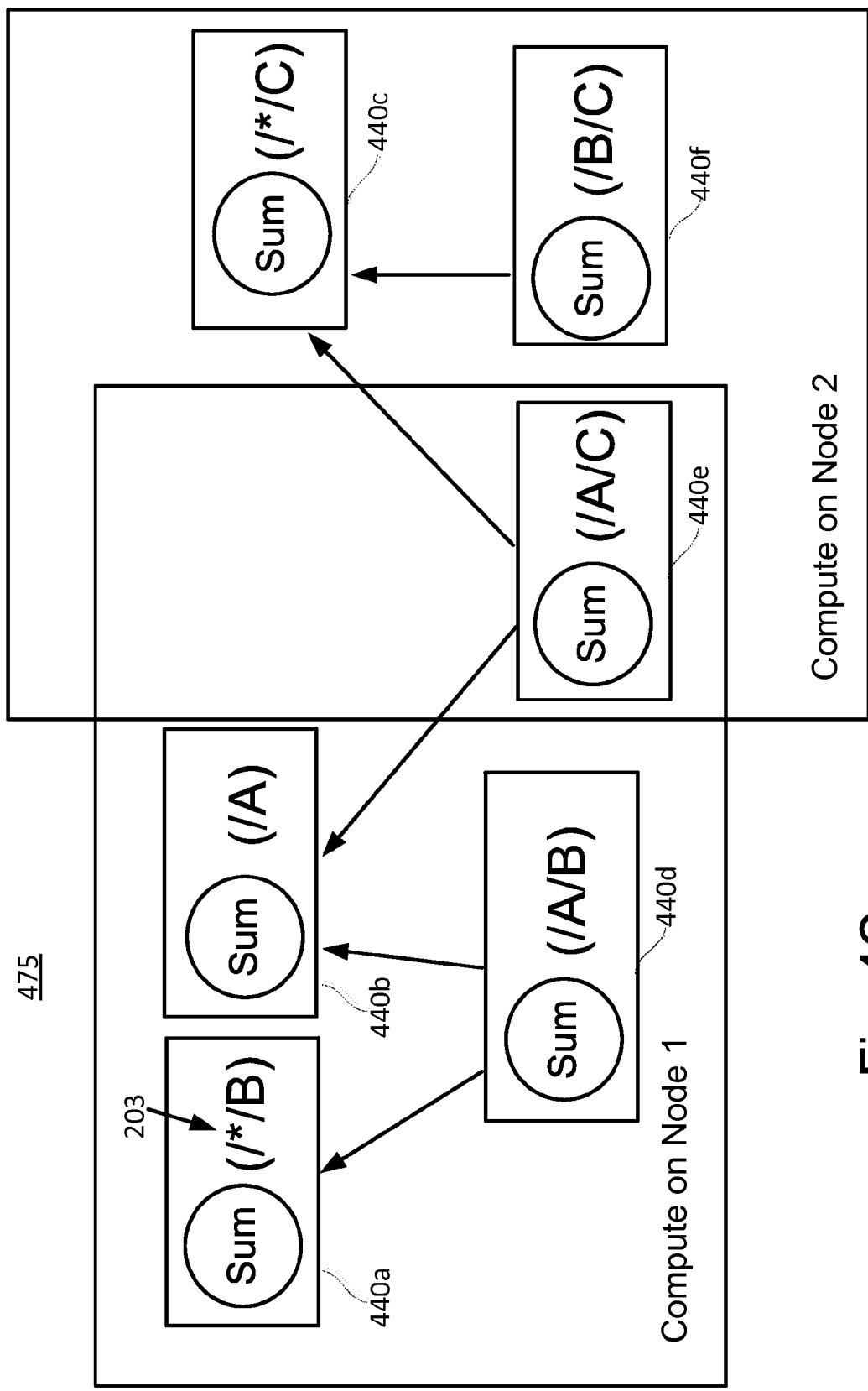
FIG. 4C depicts an example dependency graph in accordance with one embodiment.

In step 404, a dependency graph 475 is determined for all of the calculations in the system. FIG. 4C shows a simple example of one embodiment of a dependency graph 475 for a system having six context groups 440a-440f. In this example, each context group 440 has a calculation (Sum) to aggregate some metric 201. For example, the calculation could be to sum response times for some transaction. Each context group 440 has a context 203. For example, context group 440a has the context "/*B". Together, the calculation and context 203 may be referred to as a "context group." The contexts 203 for each calculation may be used to determine the metrics 201 that are needed to perform that particular calculation.

The context groups 440a, 440b, 440c in the top row each depend on at least one context group in the second row. For example, context group 440b depends on both context group 440d and context group 440e. To efficiently perform the six calculations in this dependency graph 475 on two compute nodes 190, compute node 1 might compute the calculations in context groups 440a, 440b, 440d, and 440e. Further, compute node 2 might compute the calculations in context groups 440c, 440e, and 440f. In this example, the calculation in context group 440e might be performed on both compute nodes; however, overall the six calculations can be performed very efficiently.

In one embodiment, the dependency graph 475 in FIG. 4C is determined using a topological sort of the context groups 440. After the topological sort, each context group 440 is associated with a level, where context groups 440 in level 0 (e.g., lowest level) have no dependency on other computations, context groups 440 on level 1 depend on context groups 440 on level 0, etc.

In step 406, the metrics 201 needed to compute each context group 440 are determined. For example, for a context group in level 2 (not depicted in FIG. 4B), the set of metrics that are required to compute its calculation efficiently is the set of metrics required by the level 1 context groups 440 that it depends on, which in turn is determined by the set of metrics required by the context groups 440 on level 0 that they depend on. Referring to FIG. 4C, to efficiently compute the calculation of context group 440b, the set of metrics may be those that are associated with context groups 440b, 440d, and 440e.

In step 408, topics are defined. The topics may be defined based on groups of metrics 201. Each topic may be based on one of the top level context groups 440 and its sub-tree, as one possibility. For example, a first topic may be based on context groups 440a and 440d, a second topic may be based on context groups 440b, 440d and 440e, a third topic may be based on context groups 440c, 440e, and 440f. In this example, node 1 may listen for topics 1 and 2, whereas node 2 may listen for topic 3.

In the example based on FIG. 4C, topics 1 and 2 could be combined into a single topic. Note that in the dependency graph 475 of FIG. 4C that the context for context group 440d (/A/B) is a subset of the context for context group 440a (/*/B) and context group 440b (/A). Likewise, note that the context for context group 440e (/A/C) is a subset of the context for context group 440*b* (/A). This may be used to determine a context groups to include in a topic.

Also note that the context for both context group 440*e* (/A/C) and context group 440*f* (/B/C) are each a subset of the context for context group 440*c* (/*/C). This may be used to determine context groups to include in a topic.

In step 410, appropriate contexts are assigned to the topics. In the example of FIG. 4C, the appropriate contexts may be determined by examining the contexts 203 in each context group 440 in the topic.

Figure 4D:
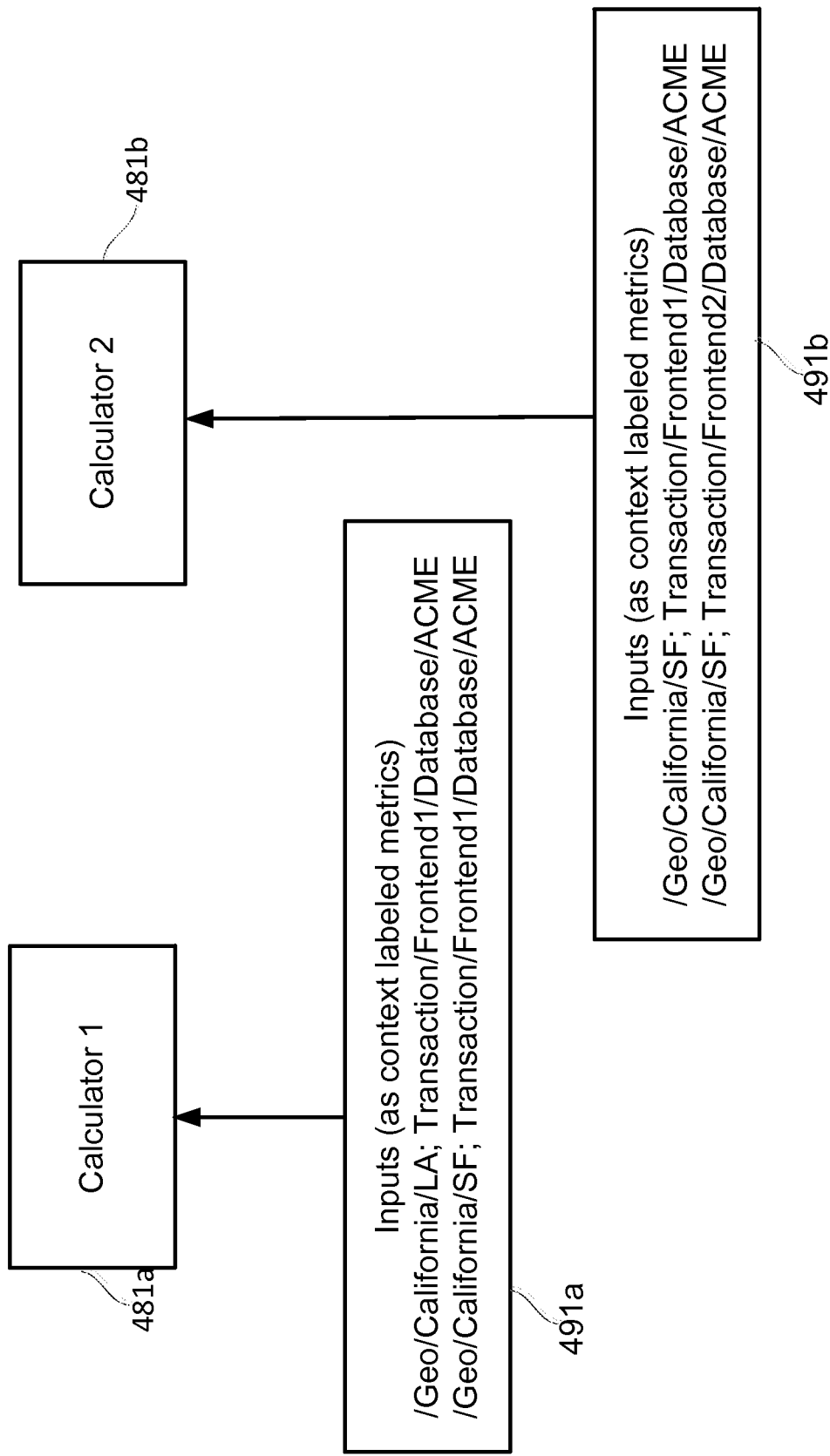
FIG. 4D provides further details of one embodiment of defining topics.

FIG. 4D provides further details of one embodiment of defining topics. In this example, two calculators 481*a*, 481*b* are defined in terms of the example Geography context of FIG. 2B and the example Transaction context of FIG. 2C. Calculator 1 computes the average response time of all ACME servers in California. The performance metric inputs 491*a* for Calculator 1 are "|Geography|California|*", and "|Transaction|*|*|ACME." In this notion, the wildcard "*" indicates that all nodes at that level are inputs. For example, for the geography context, both San Francisco and Los Angeles are inputs.

Calculator 2 computes the average response time of all ACME servers in San Francisco. The performance metric input 491*b* for Calculator 2 are "|Geography|California|San Francisco"; and "|Transaction|*|*|ACME."

In this example, calculator 1 and calculator 2 may initially be defined as top level calculators. As such, they may initially be each assigned their own topic. For example, calculator 1 could be initially assigned the topic "Metrics Related to ACME Servers in California," and calculator 2 may initially be assigned the topic "Metrics Related to ACME Servers in San Francisco."

However it may be determined that the performance metrics of calculator 1 contain all of the performance metrics of calculator 2. Therefore, if Workload Mapper 196 assigns Calculator 1 and Calculator 2 to the same compute node, it may collapse topic 2 into topic 1. A new topic might be named "Databases in California" to replace the other two topics.

Figure 4E:
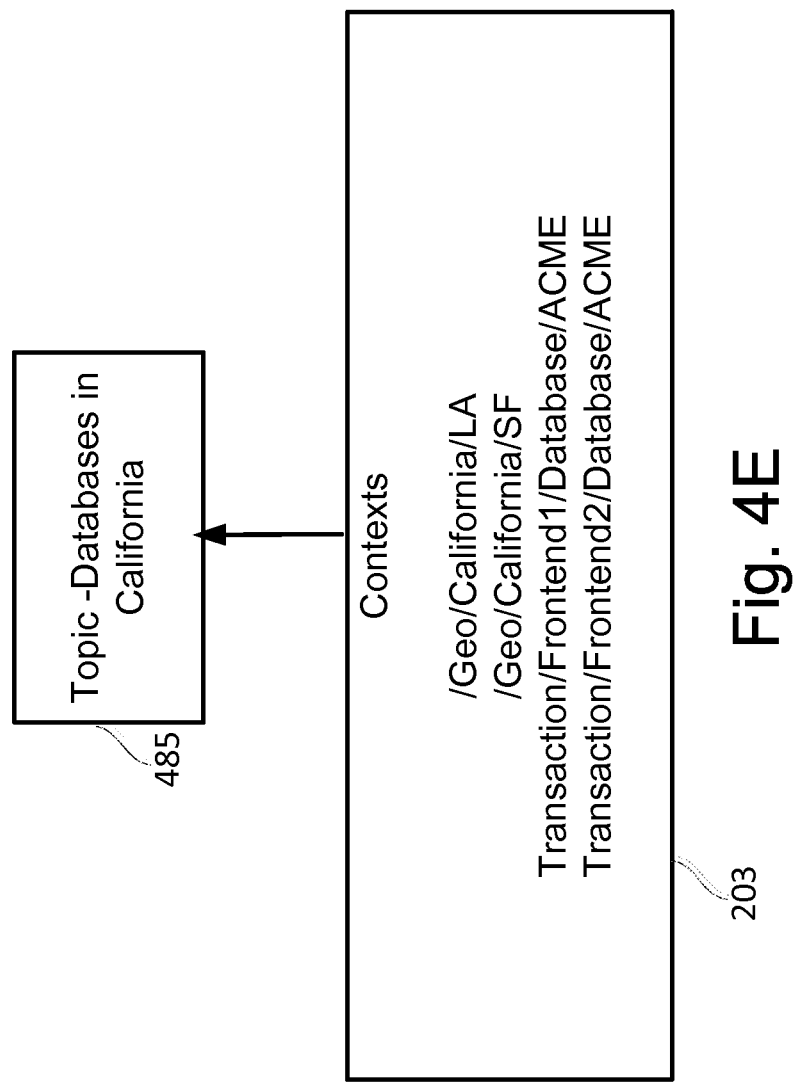
FIG. 4E depicts an example of a topic that may be generated in accordance with one embodiment.

FIG. 4E depicts an example of the new topic 485 that may be generated after collapsing topic 2 into topic 1 in the present example. This topic may be one of the topics in the topic list 484. The contexts 203 for that topic are depicted below it. In one embodiment, the Harvesters 194 are provided the topic list 484, with contexts 203 that are associated with each topic 485 so that the Harvester 194 may determine which context bound metrics 370 to send to each topic queue.

Figure 4F:
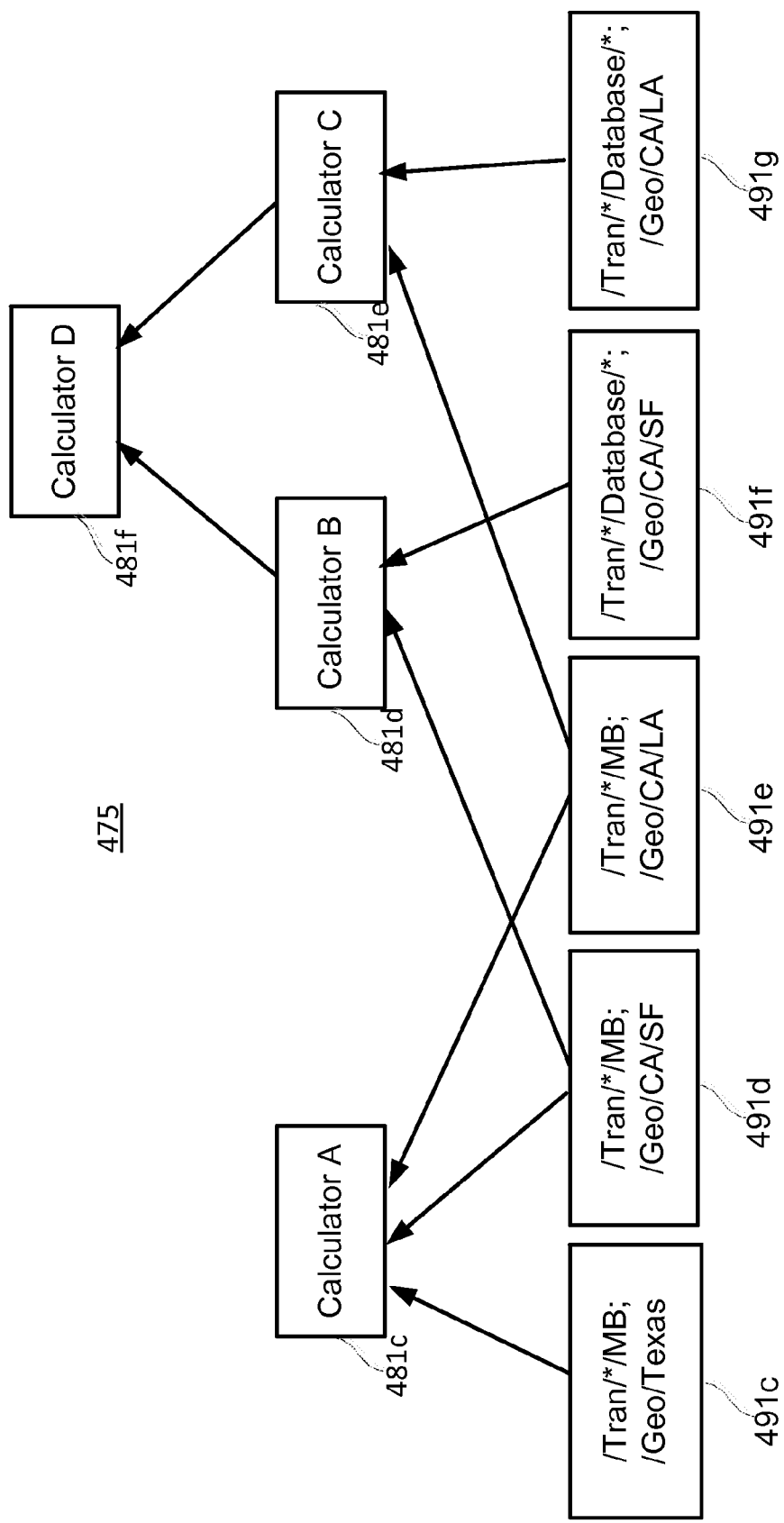
FIG. 4F depicts one embodiment of dependency graph.

FIG. 4F depicts another example dependency graph 475, and will be referred to in order to discuss how topics may be defined. This example also uses the example context trees of FIGS. 2B and 2C. In this example, calculator A 481*c* inputs metrics for all message brokers, calculator B 481*d* inputs metrics for all databases or message brokers in San Francisco (SF), calculator C 481*e* inputs metrics for all databases or message brokers in Los Angeles (LA), calculator D 481*f* inputs metrics for all databases or message brokers in California (CA).

The various performance metric inputs 491*c*-491*g* are represented in FIG. 4F below the calculators 481*c*-481*f*. Again, the performance metric inputs are represented by various contexts. Note that the inputs for calculator D 481*f* are the outputs of calculator B and calculator C. The dependency graph 475 of FIG. 4F may be generated during step 404 of process 400. Note that this dependency graph is represented in a different format than the one in FIG. 4C.

In this example, a topic may be defined for the top level calculators. For example, Topic A can be defined for calculator A 481*c*. Topic A may include the context bound metrics: |Transaction|*|message broker (MB); and |Geography|*. Topic D may include the context bound metrics: |Transaction|*|*; and |Geography|California|*.

In this example, some of the contexts are associated with both topics. For example, if a metric is bound with the following contexts, then it will be sent to both topics: |Transaction|Frontend2|message broker (MB); and |Geography|California|San Francisco.

Figure 4G:
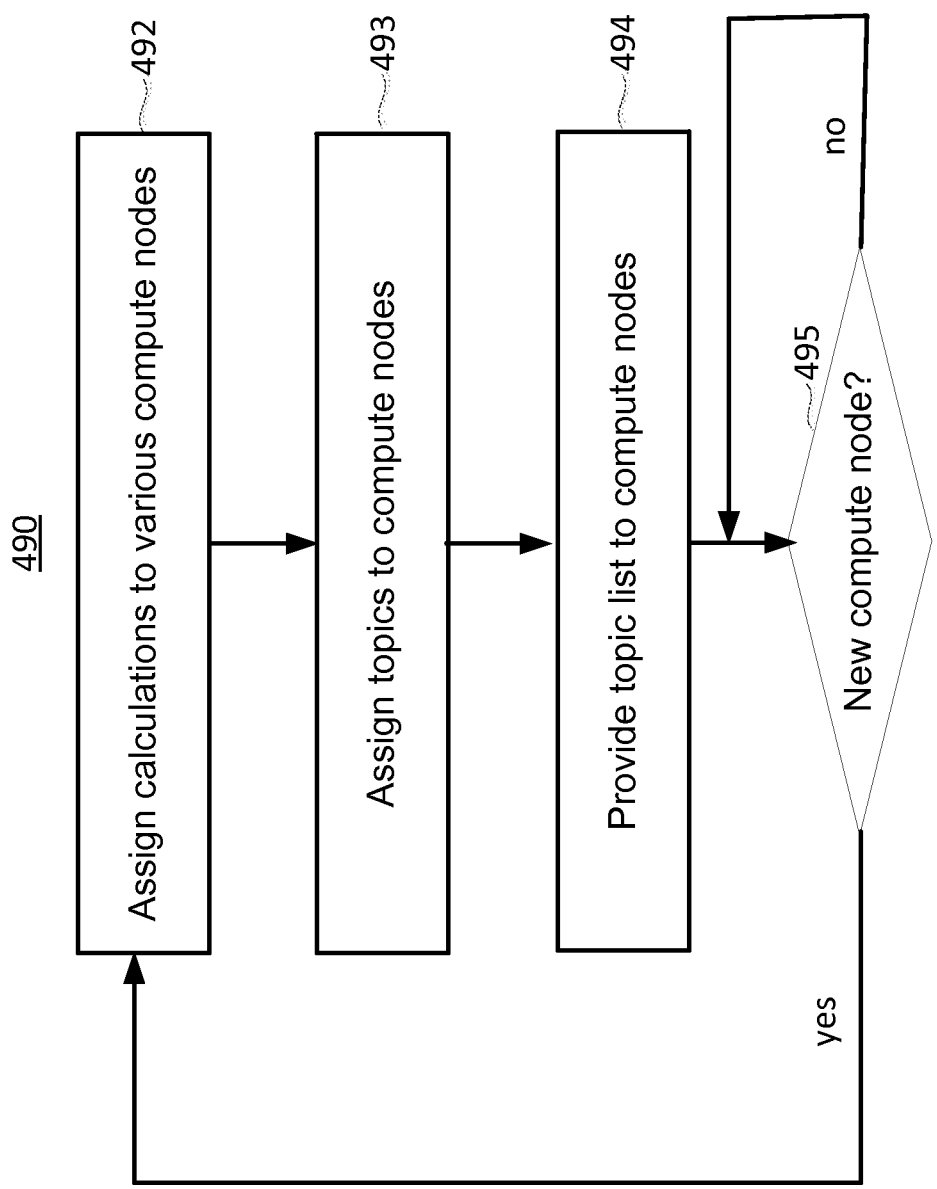
FIG. 4G is a flowchart of one embodiment of a process of a Workload Mapper dividing workload among various compute nodes.

After the Workload Mapper 196 performs process 400, the Workload Mapper 196 may divide the workload to the various compute nodes 190. FIG. 4G is a flowchart of one embodiment of a process 490 of a Workload Mapper 196 dividing workload among various compute nodes 196. In step 492, the Workload Mapper 196 assigns calculations to various compute nodes 190. Step 492 may be based on the dependencies between the calculations. In one embodiment, assigning the calculations to various nodes 190 provides full physical locality of reference. For example, execution of the calculations may be assigned to compute nodes 190 where there is an affinity to the topics in the second message bus 354.

In step 493, the Workload Mapper 196 assigns topics to the various compute nodes 190. As discussed above, there is a relationship between the calculations and the topics in one embodiment. Thus, the topics that are assigned are the ones needed to access the performance metrics for the assigned calculations, in one embodiment.

In step 494, the Workload Mapper 196 provides the topic list 484 to various compute nodes 190. As discussed herein, each topic on the topic list may have a list of one or more contexts that can be used to map context bound metrics 370 to topics.

The first time that steps 492-494 are performed may be part of an initial set up. In step 495, a determination is made whether a new compute node 190 should be added. This might be made by the Workload Mapper 196, but could be made by a different entity. For example, the customer that owns the application being monitored could decide to add another compute node 190. This decision could be based on an alert from the Workload Mapper 196. If a new compute node 190 is added, then steps 492-494 are repeated. Some compute nodes 190 may not be affected by the addition of the new compute node 190. Therefore, these compute nodes 190 need not be assigned new calculations or topics.

FIG. 5 shows further details of one embodiment of the Harvester 194. The Harvester 194 has a context to topic mapping module 504, metric mapper module 506, and publisher 508.

In one embodiment, Harvester 194 processes data that was accessed during some time interval. For example, Harvester 194 might process about 15 seconds of data prior to sending it out.

The context to topic mapping module 504 determines a topic for the metrics based on the context associated with them. In one embodiment, Workload Mapper 196 sends a topic list to Harvester 194. Each topic in the topic list may be associated with one or more contexts 203. Therefore, the contexts 203 that are needed for each topic may be derived therefrom. Module 504 may look for context bound metrics 370 that are tagged with the contexts 203 needed for a given topic. Thus, the module 504 may temporarily store the performance metrics 201 for each topic for further processing.

Prior to sending the performance metrics out, Harvester 194 may reduce the metrics so that less data needs to be transferred to the second message bus 354. For example, a portion of a calculation that is to be completed at another compute node 190 to which the metrics are being routed might be performed prior to sending the metrics to the second message bus 354. This could serve to reduce the amount of data that needs to be sent to the second message bus 354. Harvester may use the metric mapper 506 for this purpose. Metric mapper 506 maps multiple performance metrics collected on the node into a single consolidated performance metric that it writes to the outbound message bus for routing to the compute node 190 containing Analyzer 192 that reduces the performance metrics to their final value. However, the metric mapper 506 need not be used.

The publisher 508 is used to publish the reduced metrics to the various topics on the second message bus 354. This is represented by the reduced metrics/topics 570. Note that reducing the metrics is optional.

FIG. 6 shows further details of one embodiment of the Analyzer 192. The Analyzer 192 has a topic listener 602, which it uses to receive messages for topics to which it subscribes. The optional transform metrics module 606 may be used to reduce the metrics prior to performing calculations. The calculators 604 are used to perform the calculations that are assigned to it. A given Analyzer 192 may have calculators that it does not use. For example, all Analyzers 192 could be provided with all of the calculators needed by the system. However, the Analyzer 192 only need invoke those that are pertinent to the topics that were assigned to it.

In one embodiment, the Analyzer 192 performs the calculations in a way such that calculations that provide results that other calculators use as input are performed prior to the result dependent calculators. In one embodiment, the Workload Mapper 196 provides the Analyzer 192 with information (e.g., calculation order 684) that suggests an order to perform at least some of the calculations. This information may be derived from the dependency graph 475. For example, the calculation of context group 440b depends on the calculations of context groups 440d and 440e in the example of FIG. 4C.

The publisher 608 may be used to publish analyzed metrics 680 to Query Manager 111. This could include sending alerts.

FIG. 7 shows a timing diagram for one embodiment. The timing diagram is divided into multiple periods (e.g., t0-t1; t1-t2, etc.). In the first period, Harvester 194 receives some set of context bound metrics 370 from the Agents 106. As noted, these may be received by a messaging system in which the collectors place the metrics on a queue. There could be an extremely large amount of data, with possibly many millions of metric data points. This first period could be, for example, 15 seconds. The collecting of the metrics is represented by the "harvesting" arrow from t0-t1. Harvester 194 may assign topics to the context bound metrics 370 using the contexts that are bound to the metrics during this interval. However, Harvesters 194 may map several metrics into a single consolidated metric and hold off from publishing consolidated metrics to the topics until the end of time interval t0-t1. Harvester 194 may also filter the metrics, which may include performing some partial computations on the raw metric data during the first period. The filtering is not required to be performed. Note that harvesting, topic assignment, mapping, and optional filtering may be performed on the various compute nodes in parallel.

During the second period (t1-t2) further processing of the metrics received in the first period is performed. This processing may include reducing the metric data (R), computation of dependent metrics (CDM), and alerts (A). In one embodiment, the reducing include Harvester 194 reducing the mapped metrics, publishing the metrics to a topic, and Analyzer 192 further reducing the metrics for topics to which they listen. The computation of dependent metrics (CDM) may include the Analyzer using the calculators 604 on the reduced metrics. The alerts may include reporting data selectively, if certain conditions are met. For example, data may be reported if a transaction is, an average, taking too long to complete. The performance data could be reported regardless of whether an alert condition is met. In one embodiment, the harvesting cycle maintains a dependency between calculations so that values for dependent calculators are not computed prior to determining the values for the calculators from which they depend.

Figure 8:
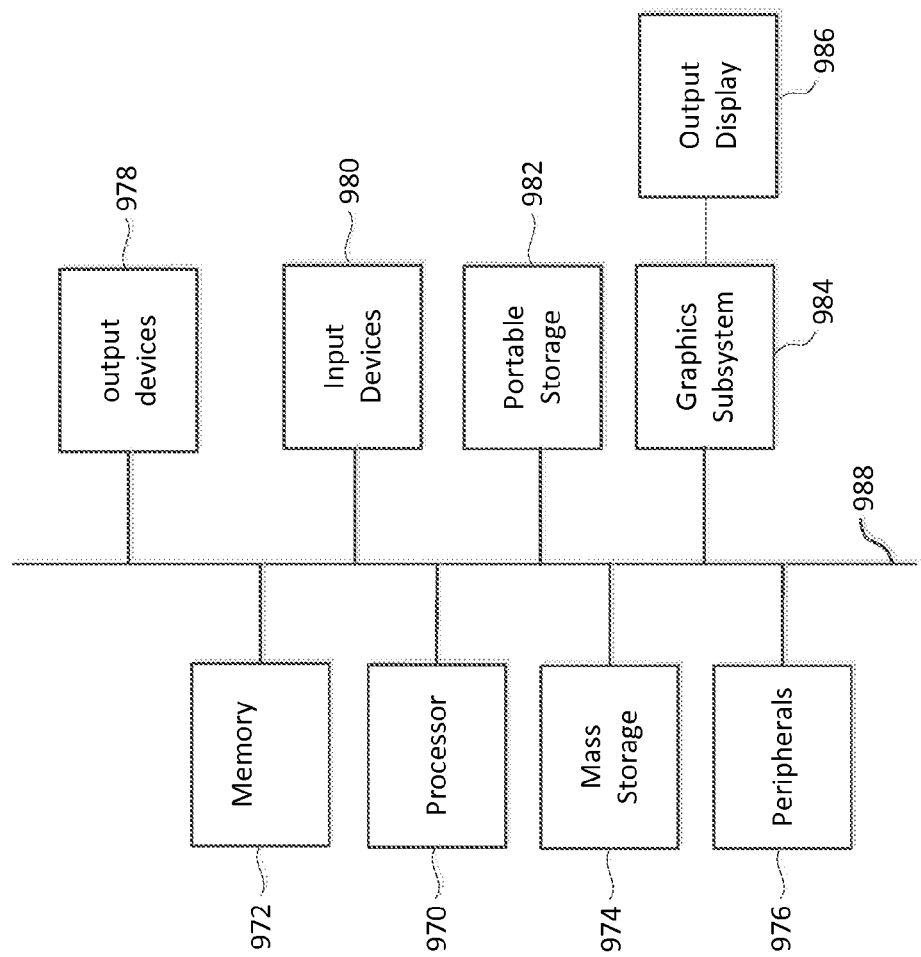
FIG. 8 illustrates a high level block diagram of a computer system which can be used to implement the technology described herein.

FIG. 8 illustrates a high level block diagram of a computer system which can be used to implement the technology described above. The computer system of FIG. 8 includes a processor unit 970 in communication with main memory 972. Processor unit 970 may contain a single microprocessor, or may contain a plurality of microprocessors for configuring the computer system as a multi-processor system. These one or more processors can perform the methods described above. Main memory 972 stores, in part, instructions and data for execution by processor unit 970. If the system described herein is wholly or partially implemented in software, main memory 972 can store the executable code when in operation. Main memory 972 may include banks of dynamic random access memory (DRAM) as well as high speed cache memory. For example, main memory 972 can store code for the Agent code, the code to run Managed computing device 205, code for the data collector 180, and/or code for the compute node 190.

The system of FIG. 8 further includes a mass storage device 974, peripheral device(s) 976, user input device(s) 980, output devices 978, portable storage medium drive(s) 982, a graphics subsystem 984 and an output display 986. For purposes of simplicity, the components shown in FIG. 8 are depicted as being connected via a single bus 988. However, the components may be connected through one or more data transport means. For example, processor unit 970 and main memory 972 may be connected via a local microprocessor bus, and the mass storage device 974, peripheral device(s) 976, portable storage medium drive(s) 982, and graphics subsystem 984 may be connected via one or more input/output (I/O) buses. Mass storage device 974, which may be implemented with a magnetic disk drive or an optical disk drive, is a non-volatile storage device for storing data and instructions for use by processor unit 970. In one embodiment, mass storage device 974 stores the system software for implementing the technology described herein for purposes of loading to main memory 972. Peripheral device(s) 976 may include any type of computer support device, such as an input/output (I/O) interface, to add additional functionality to the computer system. For example, peripheral device(s) 976 may include a network interface for connecting the computer system to a network, a modem, a router, etc. User input device(s) 980 provides a portion of a user interface. User input device(s) 980 may include an alpha-numeric keypad for inputting alpha-numeric and other information, or a pointing device, such as a mouse, a trackball, stylus, or cursor direction keys. In order to display textual and graphical information, the computer system of FIG. 8 includes graphics subsystem 984 and output display 986. Output display 986 may include a cathode ray tube (CRT) display, liquid crystal display (LCD) or other suitable display device. Graphics subsystem 984 receives textual and graphical information, and processes the information for output to display 986. Additionally, the system of FIG. 8 includes output devices 978. Examples of suitable output devices include speakers, printers, network interfaces, monitors, etc.

The components contained in the computer system of FIG. 8 are those typically found in computer systems suitable for use with the technology described herein, and are intended to represent a broad category of such computer components that are well known in the art. Thus, the computer system of FIG. 8 can be a personal computer, mobile computing device, smart phone, tablet, workstation, server, minicomputer, mainframe computer, or any other computing device. The computer can also include different bus configurations, networked platforms, multi-processor platforms, etc. Various operating systems can be used.

One embodiment includes a system comprising a storage device and a processor in communication with said storage device. The processor is programmed to receive an assigned topic of a plurality of topics to be listened for on a message bus; receive an assigned calculation of a plurality of calculations to be performed on performance metrics for an application. The performance metrics collected under a plurality of contexts. The processor is programmed to access labeled performance metrics for the application. Each performance metric is labeled with a context of the contexts under which the performance metric was collected. The processor is programmed to associate a topic of the plurality of topics with each of the performance metrics based on the context under which each of the performance metrics were collected. The processor is programmed to listen for the assigned topic in order to access the performance metrics associated with the assigned topic. The processor is programmed to perform the assigned calculation on the performance metrics associated with the assigned topic.

One embodiment includes a computer program product comprising a computer readable storage medium comprising computer readable program code embodied therewith. The computer readable program code comprises: computer readable program code configured to receive an assigned topic of a plurality of topics to be listened for on a message bus; computer readable program code configured to receive an assigned calculation of a plurality of calculations to be performed on performance metrics for an application, the performance metrics collected under a plurality of contexts; computer readable program code configured to access labeled performance metrics for the application, each performance metric labeled with a context of the contexts under which the performance metric was collected; computer readable program code configured to associate a topic of the plurality of topics with each of the performance metrics based on the context under which each of the performance metrics were collected; computer readable program code configured to listen for the assigned topic in order to access the performance metrics associated with the assigned topic; and computer readable program code configured to perform the assigned calculation on the performance metrics associated with the assigned topic.

One embodiment includes a method comprising accessing calculations to be performed on performance metrics for an application. Each of the calculations has an input based on the performance metrics. The method comprises accessing contexts associated with each of the performance metrics. The contexts pertain to a context under which the performance metrics are collected. The method comprises determining dependencies between the calculations. The method comprises determining a plurality of topics based on the dependencies between the calculations. The method comprises associating contexts with each of the plurality of topics based on the input to respective ones of the calculations and the contexts associated with each of the performance metrics.

One embodiment includes a computer program product comprising a computer readable storage medium comprising computer readable program code embodied therewith. The computer readable program code comprises computer readable program code configured to access calculations to be performed on performance metrics for a monitored application. Each of the calculations has an input based on a performance metric of the plurality of performance metrics and a context under which the performance metric is collected. The computer readable program code comprises computer readable program code configured to determine dependencies between the calculations. The computer readable program code comprises computer readable program code configured to determine a plurality of topics based on the dependencies between the calculations. The computer readable program code comprises computer readable program code configured to associate contexts with each of the plurality of topics based on the input to respective ones of the calculations.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:
1. A method comprising:
assigning a topic of a plurality of topics in a topic-based messaging system to each of a plurality of compute nodes;

monitoring an application that executes on a computing device, wherein the monitoring is performed by a plurality of agents that execute on the computing device;

collecting performance metrics based on the monitoring, wherein the performance metrics are collected by the plurality of agents under a plurality of contexts;

labeling, by the plurality of agents, each of the performance metrics with the context under which the respective performance metric was collected;

receiving, at various compute nodes of the plurality of compute nodes, the labeled performance metrics for the application;

associating, by the various compute nodes, a topic of the plurality of topics with each of the performance metrics based on the context with which the performance metric was labeled;

publishing as a message to the respective topic in the topic-based messaging system, by the various compute nodes, the performance metrics that were associated with the topics;

listening, at respective ones of the compute nodes, for the topic assigned to the respective compute node in order to access the performance metrics associated with the topic assigned to the respective compute node; and analyzing, at respective ones of the compute nodes, the performance metrics associated with the topic assigned to the respective compute node.

2. The method of claim 1, wherein each of the topics is associated with a set of calculations that are from a plurality of calculations to be performed on the performance metrics, the analyzing, at respective ones of the compute nodes, the performance metrics associated with the topic assigned to the respective compute node comprises performing the set of calculations.

3. The method of claim 1, further comprising:
determining, by executing workload mapper code on a processor, dependencies between a plurality of calculations that are to be performed on the performance metrics;
dividing the plurality of calculations over the plurality of compute nodes based on the dependencies between the plurality of calculations by executing the workload mapper code on the processor; and
associating the plurality of calculations with the plurality of topics by executing the workload mapper code on the processor.

4. The method of claim 3, further comprising:
determining, by executing the workload mapper code on the processor, the plurality of topics based on the dependencies between the plurality of calculations; and
associating, by executing the workload mapper code on the processor, appropriate contexts of the plurality of contexts with respective ones of the plurality of topics based on inputs to the calculations.

5. The method of claim 1, wherein subscribers in the topic-based system receive all messages published to the topics to which the subscribers subscribe.

6. The method of claim 1, further comprising:
publishing, by respective ones of the plurality of agents, the performance metrics and associated contexts to a queue, wherein the receiving of labeled performance metrics for the application comprises the plurality of compute nodes accessing the queue.

7. The method of claim 6, wherein the receiving of labeled performance metrics for an application comprises:
accessing the performance metrics and associated contexts from the queue by the plurality of compute nodes such that the performance metrics are load balanced across the plurality of compute nodes.

8. The method of claim 7, further comprising:
publishing, by a first compute node of the compute nodes, the performance metrics that the first compute node accessed from the queue to various topics in the topic-based messaging system that are associated with other compute nodes.

9. The method of claim 1, wherein each of the topics is a named logical channel.

10. A system comprising:
a storage device; and
a processor in communication with said storage device, said processor programmed to:
receive an assigned topic of a plurality of topics in a topic-based messaging system to be listened for on a message bus;
subscribe to the assigned topic with the topic-based messaging system, wherein subscribers in the topic-based system receive all messages published to the topic to which they subscribe;
receive an assigned calculation of a plurality of calculations to be performed on performance metrics for an application, the performance metrics collected under a plurality of contexts;
access labeled performance metrics for the application from a message queue, each performance metric being labeled with a context of the contexts under which the performance metric was collected;
associate a topic of the plurality of topics with each of the accessed performance metrics based on the context with which each of the performance metrics was labeled;
publish the accessed performance metrics to the respective topic that was associated with each performance metric in the topic-based messaging system, including publish to a topic other than the assigned topic;
listen for the assigned topic in order to access the performance metrics associated with the assigned topic; and
perform the assigned calculation on the performance metrics associated with the assigned topic.

11. The system of claim 10, wherein said processor is further programmed to:
determine dependencies between the plurality of calculations that are to be performed on the performance metrics;
divide the plurality of calculations over a plurality of compute nodes based on the dependencies between the plurality of calculations; and
associate the plurality of calculations with the plurality of topics.

12. The system of claim 11, wherein said processor is further programmed to:
determine the plurality of topics based on the dependencies between the calculations; and
associate appropriate contexts of the plurality of contexts with respective ones of the plurality of topics based on inputs to the calculations, the inputs being based on the performance metrics.

13. The system of claim 10, wherein said processor is further programmed to:
monitor the application by a plurality of agents;
generate the performance metrics based on the monitoring;
associate a context of the plurality of contexts to each of the performance metrics; and
publish the performance metrics and associated contexts to the message queue.

14. A computer program product comprising:
a non-transitory computer readable storage medium comprising computer readable program code embodied therewith, the computer readable program code comprising:
computer readable program code configured to receive an assigned topic of a plurality of topics to be listened for on a message bus in a topic-based messaging system;
subscribe to the assigned topic with the topic-based messaging system, wherein subscribers in the topic-based system receive all messages published to the topic to which they subscribe;
computer readable program code configured to receive an assigned calculation of a plurality of calculations to be performed on performance metrics for an application, the performance metrics collected under a plurality of contexts;
computer readable program code configured to access labeled performance metrics for the application from a message queue, each performance metric labeled with a context of the contexts under which the performance metric was collected;
computer readable program code configured to associate a topic of the plurality of topics with each of the performance metrics based on the context under which each of the performance metrics was labeled;
computer readable program code configured to publish the accessed performance metrics to the respective topic that was associated with each performance metric in the topic-based messaging system, including publish to a topic other than the assigned topic;
computer readable program code configured to listen for the assigned topic on the message bus in order to access the performance metrics associated with the assigned topic; and
computer readable program code configured to perform the assigned calculation on the performance metrics associated with the assigned topic.

15. The computer program product of claim 14, wherein the computer readable program code further comprises:
computer readable program code configured to determine dependencies between the plurality of calculations that are to be performed on the performance metrics;
computer readable program code configured to divide the plurality of calculations over a plurality of compute nodes based on the dependencies between the plurality of calculations; and
computer readable program code configured to associate the plurality of calculations with the plurality of topics.

16. The computer program product of claim 15, wherein the computer readable program code further comprises:
computer readable program code configured to determine the plurality of topics based on the dependencies between the calculations; and
computer readable program code configured to associate contexts of the plurality of contexts with respective ones of the plurality of topics based on inputs to the calculations.

17. A method comprising:
accessing, by executing code on a processor, calculations to be performed on performance metrics for an application, each of the calculations has an input based on the performance metrics;
accessing, by executing the code on the processor, contexts associated with each of the performance metrics, the contexts pertain to a context under which the performance metrics are collected;
determining, by executing the code on the processor, dependencies between the calculations;
determining, by executing the code on the processor, a plurality of topics based on the dependencies between the calculations, the topics are topics in a topic based message system in which subscribers receive all messages published to the topic to which they subscribe;
associating, by executing the code on the processor, contexts with each of the plurality of topics based on the input to respective ones of the calculations and the contexts associated with each of the performance metrics;
assigning, by executing the code on the processor, the calculations to respective ones of a plurality of compute nodes based on the dependencies between the calculations;
assigning, by executing the code on the processor, the plurality of topics to the plurality of compute nodes based on the dependencies between the calculations, wherein the topics are assigned to the respective compute nodes such if the respective compute node subscribes to a given topic the respective compute node will receive performance metrics needed for calculations assigned to the respective compute node; and
providing, by executing the code on the processor, a list of the topics to the plurality of compute nodes, wherein each topic on the topic list comprises a list of one or more contexts to map context bound performance metrics to topics.

18. The method of claim 17, further comprising:
establishing a new compute node to perform a new calculation or to off-load a calculation from another compute node.

19. The method of claim 17, wherein an input of a first calculation of the calculations is based on a first performance metric of the performance metrics, the input is further based on a context under which the first performance metric is collected.

20. The method of claim 17, wherein assigning the calculations to respective ones of the plurality of compute nodes provides full physical locality of reference.

21. The method of claim 17, wherein the calculations are assigned to compute nodes where there is an affinity to the topics in a message bus of the topic based message system.

22. A computer program product comprising:
a non-transitory computer readable storage medium comprising computer readable program code embodied therewith, the computer readable program code comprising:
computer readable program code configured to access calculations to be performed on a plurality of performance metrics for a monitored application, each of the calculations has an input based on a performance metric of the plurality of performance metrics and a context under which the performance metric is collected;
computer readable program code configured to determine dependencies between the calculations;
computer readable program code configured to determine a plurality of topics based on the dependencies between the calculations, the topics are topics in a topic based message system in which subscribers receive all messages published to the topic to which they subscribe;
computer readable program code configured to associate contexts with each of the plurality of topics based on the input to respective ones of the calculations;

computer readable program code configured to assign the calculations to respective ones of a plurality of compute nodes based on the dependencies between the calculations;

computer readable program code configured to assign the plurality of topics to the plurality of compute nodes based on the dependencies between the calculations, wherein the topics are assigned to the respective compute nodes such if the respective compute node subscribes to a given topic the respective compute node will receive performance metrics needed for calculations assigned to the respective compute node; and computer readable program code configured to provide a list of the topics to the plurality of compute nodes, wherein each topic on the topic list comprises a list of one or more contexts to map context bound performance metrics to topics.

* * * * *